United States Patent [19]

Fujii et al.

[11] Patent Number: 4,663,431
[45] Date of Patent: May 5, 1987

[54] PROCESS FOR PREPARING POLYARYLENE SULFIDE WITH ALKALI METAL SALT OF PHENOLIC AROMATIC SULFONIC ACID

[75] Inventors: Tsuguo Fujii; Katsumasa Yamamoto, both of Otsu; Tetsuo Aratani, Joyo; Yoshinori Uegaki, Kyoto, all of Japan

[73] Assignee: Toyo Boseki Kabushiki Kaisha T/u Toyobo Co, Ltd., Osaka, Japan

[21] Appl. No.: 858,988

[22] Filed: May 2, 1986

[30] Foreign Application Priority Data

May 7, 1985 [JP] Japan .................................. 60-97298
May 16, 1985 [JP] Japan ................................ 60-104393

[51] Int. Cl.$^4$ ............................................ C08G 75/16
[52] U.S. Cl. ................................................... 528/388
[58] Field of Search ......................................... 528/388

[56] References Cited

FOREIGN PATENT DOCUMENTS 221331 5/1983 Japan .

Primary Examiner—Harold D. Anderson

[57] ABSTRACT

A process for preparing a polyarylene sulfide which comprises reacting an alkali metal sulfide compound and a polyhalo-substituted aromatic compound in an organic polar solvent in the presence of
(A) an alkali metal salt of a phenolic aromatic sulfonic acid of the formula:

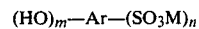

$$(HO)_m-Ar-(SO_3M)_n$$

wherein Ar is a di- to tetravalent aromatic group having 6 to 24 carbon atoms; M is an alkali metal; and m and n are each 1 or 2,
(B) an alkali metal hydroxide and/or an alkali metal alcoholate, and optionally,
(C) an alkali metal salt of sulfuric acid.

7 Claims, No Drawings

PROCESS FOR PREPARING POLYARYLENE SULFIDE WITH ALKALI METAL SALT OF PHENOLIC AROMATIC SULFONIC ACID

FIELD OF THE INVENTION

The present invention relates to a process for preparing a polyarylene sulfide. More particularly, it relates to a process for preparing a polyarylene sulfide having high melt viscosity, great whiteness, excellent heat stability and controlled crystallization rate.

BACKGROUND OF THE INVENTION

Recently, polyarylene sulfides have been noted as plastics having melt molding properties and heat resistance, and have been widely utilized in various fields. For example, they are utilized in the production of various molding articles by subjecting them to injection molding or extrusion molding, and further, fibers and films are produced by subjecting them to melt extrusion and then, optionally, orienting and heat setting the extruded products. Furthermore, they are utilized in protective films of metals such as sealing compounds or coatings of IC and transistors by subjecting them to injection molding.

As a process for preparing polyarylene sulfides (hereinafter referred to as PPS), Japanese Patent Publication No. 3368/1970 discloses a reaction of an alkali sulfide and a dihalo-substituted aromatic compound in an organic polar solvent such as N-methylpyrrolidone. A polymer prepared by such a process has low melt viscosity and, therefore, it is difficult to extrude by melt extrusion. Even if it is extruded, further difficulty is encountered in the production of fiber or film having high strength by orienting it after melt extrusion. Accordingly, a procedure for increasing melt viscosity has been employed, wherein a somewhat larger amount of the polyhalo-substituted aromatic compound is added to the polymerization reaction, or heating is effected after the polymerization reaction to proceed branching and cross linking reaction.

On the other hand, in order to increase melt viscosity or intrinsic viscosity without employing the above procedure, the use of various polymerization catalysts has been investigated. For example, the use of alkali metal carboxylates is proposed in Japanese Patent Publication No. 12240/1977 and the use of fatty acid alkaline earth metal salts is proposed in Japanese Patent Laid Open Publication No. 40738/1980. U.S. Patent No. 4,038,260 discloses alkali metal salts of organic sulfonic acids: Japanese Patent Laid Open Publication No. 43139/1980 discloses alkali metal salts of specific aromatic sulfonic acids: Japanese Patent Laid Open Publication No. 20030/1981 discloses tri-alkali metal salts of phosphoric acid: and Japanese Patent Laid Open Publication No. 20031/1981 discloses di-alkali metal salts of phosphonic acid. Further, Japanese Patent Laid Open Publication No. 22113/1983 discloses metal salts of organic carboxylic acids or organic sulfonic acids: and Japanese Patent Laid Open Publication No. 206632/1983 discloses combination of organic carboxylic acids or sulfonic acids and alkali hydroxides. In addition, Japanese Patent Laid Open Publication No. 25822/1984 discloses the use of alkali metal salts of organic carboxylic acids together with a polyoxyethylene ether to reduce a content of electrolytes.

By using these catalysts, it is possible to increase melt viscosity or intrinsic viscosity, or to reduce a content of electrolytes.

However, in order to obtain PPS having high melt viscosity by using these catalysts, it is required to use the catalysts in a relatively larger amount such as about 0.2 to 1 mole based on the alkali sulfide. Further, when these catalysts are used, it is difficult to reduce a metal content in a polymer by employing a conventional washing with hot water, acetone and the like.

Usually, PPS bubbles slightly or, depending upon conditions, vigorously during melt extrusion and injection steps. This is caused by low heat resistance of the polymer and, generally, it is considered that this is resulted from oxidation of sulfur atom in the polymer to generate sulfur dioxide. In order to prevent this, addition of various additives has been also proposed.

Further, generally, PPS is obtained as a slightly colored material and, according to a particular polymerization catalyst used, it is colored in pale brown to pale off-white. Heretofore, it has not been succeeded in the production of PPS in pure white because coloring itself occurs during polymerization and it is difficult to increase whiteness after the polymerization, while heat resistance can be improved, and progress of coloring in the later stages can be controlled by addition of an additive. When whiteness of a polymer is inferior, fibers and films as well as molded articles produced therefrom can hardly be marketed and, therefore, it has been requested to produce a polymer which has great whiteness after the polymerization reaction.

As is seen from the above, in a conventional process, it has been very difficult to obtain PPS which meets all the requirements such as high melt viscosity or intrinsic viscosity, a low content of electrolytes, great whiteness and high heat stability, and can be polymerized stably and economically by using a smaller amount of a polymerization catalyst.

Under these circumstances, the present inventors have intensively studied to obtain PPS which can meets these requirements. As the result, it has been found that desired PPS can be obtained by using certain polymerization catalysts.

OBJECTS AND SUMMARY OF THE INVENTION

The main object of the present invention is to provide a novel process for preparing PPS having high melt viscosity, great whiteness, excellent heat stability and controlled crystallization rate.

This object as well as other objects and advantages of the present invention will become apparent to those skilled in the art from the following description.

According to the present invention, there is provided a process for preparing a polyarylene sulfide which comprises reacting an alkali metal sulfide compound and a polyhalo-substituted aromatic compound in an organic polar solvent in the presence of (A) an alkali metal salt of a phenolic aromatic sulfonic acid of the formula:

$$(HO)_m-Ar-(SO_3M)_n \qquad (I)$$

wherein Ar is a di- to tetravalent aromatic group having 6 to 24 carbon atoms; M is an alkali metal: and m and n are each 1 or 2, and (B) an alkali metal hydroxide and/or an alkali metal alcoholate.

Further, in another aspect of the present invention, a polyarylene sulfide is prepared by carrying out the above reaction in the presence of (C) an alkali metal salt of sulfuric acid, in addition to the above catalysts of (A) and (B).

DETAILED DESCRIPTION OF THE INVENTION

The alkali metal sulfide compound used in the process of the present invention is lithium sulfide, sodium sulfide, potassium sulfide, rubidium sulfide, cesium sulfide or a mixture thereof. Further, a hydride or an aqueous solution thereof can be also used. In case of using the hydride or the aqueous solution, it can be dehydrated prior to addition of the polyhalo-substituted aromatic compound. By the way, the alkali metal sulfide compound can be prepared from an aqueous solution of an alkali bisulfide and an aqueous solution of an alkali hydroxide. Further, a trace amount of an alkali bisulfide and an alkali metal thiosulfate contained in the alkali metal sulfide compound can be neutralized by a small amount of an alkali hydroxide.

The polyhalo-substituted aromatic compound used in the present invention includes di-, tri- and tetrahalo-substituted aromatic compound. As the monomer to be reacted with the alkali metal sulfide compound, the dihalosubstituted aromatic compound is mainly used. However, the tri- or teterahalo-substituted aromatic compound can be copolymerized in order to introduce a branched structure into the polymer to increase melt viscosity, to proceed the polymerization reaction efficiently, or to control crystallization rate.

Examples of the dihalo-substituted aromatic compound include p-dihalo-substituted compounds such as p-dichlorobenzene, 2,5-dichloro-p-xylene, 4,4-dichlorodiphenyl sulfone, 2,5-dichlorotoluene, 4,4-dichlorodiphenyl ether, dichloronaphthalene, dibromonaphthalene, dichlorobenzophenone and dibromobenzophenone; m-dihalo-substituted compounds such as m-dichlorobenzene: and o-dihalo-substituted compounds such as o-dichlorobenzene.

Examples of the trihalo- and tetrahalo-substituted aromatic compounds include 1,2,4-trichlorobenzene, 1,2,3-trichlorobenzene, 2,4,6-trichlorobenzene, 2,4,6-trichlorotoluene, 1,2,4-tribromobenzene, 1,2,3-trichloronaphthalene, 1,2,4-trichloronaphthalene, and 1,2,3,4-tetrachloronaphthalene.

As the organic polar solvent in which the polymerization reaction of the present invention is carried out, there can be used, for example, N-methylpyrrolidone, hexamethylphosphoric triamide, N-methylformamide, N,N'-dimethylacetamide, caprolactam, N-methyl-ε-caprolactam, tetramethylurea, dimethylacetamide and the like.

In the present invention, the above compounds (A), (B) and, optionally, (C) are used as polymerization catalysts.

The polymerization catalyst (A) is a alkali metal salt of a phenolic aromatic sulfonic acid of the formula (I). In the formula (1), the group Ar includes, for example,

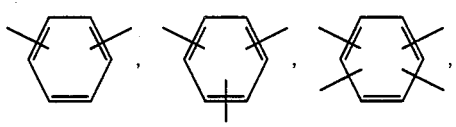

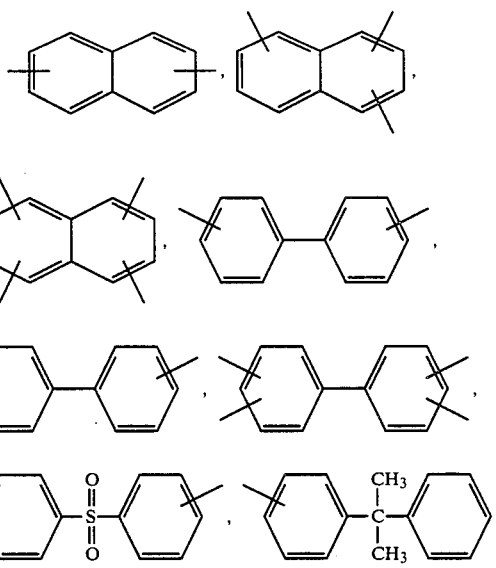

and the like. Among them, phenylene is preferred. Examples of M include sodium, lithium, potassium and the like.

Particularly, examples of the alkali metal salt of the phenolic aromatic sulfonic acid (A) include the alkali metal salts of phenol-4-sulfonic acid, phenol-2-sulfonic acid, phenol-2,4-disulfonic acid, resorcinol-4-sulfonic acid, resorcinol-4,6-disulfonic acid, pyrocatechol-4-sulfonic acid, 2-oxytoluene-4-sulfonic acid, 3-oxytoluene-4-sulfonic acid, 4-oxytoluene-2-sulfonic acid, hydroquinone sulfonino acid, hydroquinone-2,5-disulfonic acid, 2-naphthol-6-sulfonic acid (Schaffer's acid), 2-naphthol-1-sulfonic acid (hydroxy-Tobias-acid), 1-naphthol-4-sulfonic acid (Nevile-Winther's acid) and 2-naphthol-8-sulfonic acid (Crocein acid). Anhydrides, hydrides and aqueous solutions thereof can be also used. The catalyst (A) can be used in an amount of 0.02 to 1.0 mole, preferably, 0.05 to 0.15 mole per 1 mole of the alkali metal sulfide compound.

The catalyst (B) which is used together with the catalyst (A) is an alkali metal hydroxide and/or an alkali metal alcoholate. Examples of the catalyst (B) include sodium hydroxide, potassium hydroxide, lithium hydroxide, soidum methylate, sodium ethylate, potassium methylate, potassium ethylate, lithium methylate and lithium ethylate. The catalyst (B) can be used in the molar ratio to hydroxy group of the catalyst (A) of 0.5 to 1.5, preferably 0.8 to 1.5, more preferably 0.9 to 1.1. When the molar ratio is not within this range, inefficient progress of the polymerization reaction, or decomposition of the polymer once formed in the reaction system is resulted and it is undesirable.

The catalyst (C) which is optionally used together with the catalysts (A) and (B) is an alkali metal salt of sulfuric acid. Examples of the catalyst include sodium sulfate, potassium sulfate, lithium sulfate, a hydride thereof and an aqueous solution thereof. Water contained in these compounds may be dehydrated prior to addition of the polyhalo-substituted aromatic compound. The catalyst (C) can be used in the molar ratio to hydroxy group of the catalyst (A) of 0.2 to 10, preferably 0.5 to 5.

The catalysts (A), (B) and (C) can be added to the reaction system simultaneously, or either the catalysts (A) and (B) or all of them can be previously mixed and then added to the reaction system.

In a preferred embodiment, the process for preparing PPS of the present invention is carried out as follows.

Firstly, the alkali metal sulfide compound is added to the organic polar solvent and, under nitrogen atmosphere, preferably, with bubbling nitrogen gas through the resulting mixture, temperature is gradually raised to 210° C. with stirring. During this step, the alkali metal salt of phenolic aromatic sulfonic acid (A), the alkali metal hydroxide and/or the alkali metal alcoholate (B), and optionally, the alkali metal salt of sulfuric acid (C) are added to the mixture in one portion or by small portions. Alternatively, these catalysts may be present from the beginning.

After removing water derived from the reactants used such as those in the form of the hydride, the aqueous solution, etc. or an alcohol derived from the alcoholate used from the mixture, the reaction mixture is cooled to a temperature of about 150° to 180° C. At this stage, the polyhalo-substituted aromatic compound is added to the mixture and, if necessary, additional solvent is also added. By the way, when a mixture of the catalysts (A) and (B) is previously dehydrated or alcohol is previously removed from the mixture of (A) and (B) by heating, they may be added to the reaction mixture at this stage.

Then, the reaction system is closed, and the reaction is carried out for 1 to 2 hours, while the temperature is gradually raised from about 210° C. to 280° C. under 10 to 30 kg/cm$^2$. The reaction is further continued for 1 to 3 hours after the mixture reached to the maximum temperature. Since this is an exothermic reaction, the reaction temperature should be cautiously raised without rapid heating.

After completion of the reaction, the reaction system is cooled and the solvent is filtered off from the reaction mixture. The residue is washed with hot water, water, acetone, etc. to remove the organic solvent, salts and the polymerization catalysts, and then it is dried. During or after cooling the reaction system, the reaction mixture may be introduced into hot water or water and then, subjected to the above work up procedure. After drying, the desired white polymer powder is isolated.

Although the effect of the alkali metal salt of phenolic aromatic compound (A) used in the present invention has not yet been fully made clear, it is considered that the phenolic hydroxy group thereof attributes to improvement of heat stability and whiteness.

Further, it is assumed that the phenolic hydroxy group effects on solubility and precipitation of the polymer in the reaction system to assist precipitation of the polymer in fine powder, and also effects on separation of itself and other salts from the polymer.

In addition, it is considered that the alkali metal salt of sulfuric acid (C) enhances heat stability of the polymer formed in the organic solvent.

The following Examples and Comparative Examples further illustrate the present invention in detail but are not to be construed to limit the scope thereof.

Each physical data in the Examples and Comparative Examples are determined as follows.

Intrinsic Viscosity

Intrinsic viscosity was expressed by the value obtained by extrapolating an intrinsic viscosity, $[\eta]=\eta_{rel}/$- polymer conc., at 206° C. in α-chloronaphthalene to that where the concentration of polymer is 0.

Melt viscosity

Melt viscosity (poise) was determined by using a melt indexer type flow tester (CFT 500 Model A manufactured by Shimazu Seisaku-sho, Japan) at 300° C. under the following conditions:
nozzle diameter: 1.0 mm:
L/D =10; and
load: 50 kg/cm$^2$.

Whiteness

A tablet of 3.5 mm thickness and 18 mm diameter was prepared and color thereof was determined by using a colorimeter (Model CR-100 manufactured by Minolta Camera, Japan). The result was expressed by L value.

Na content

Na content (ppm) was determined by dry ashing the polymer at 550° C., preparing a solution of the resulting ash in hydrochloric acid and determining Na by atomic-absroption spectroscopy.

EXAMPLE 1

N-Methylpyrrolidone (220 ml), sodium sulfide nonahydride (480 g, 2 moles), sodium p-phenol sulfonate dihydride (46.4 g, 0.2 mole) and sodium hydroxide (8 g, 0.2 mole) were placed in a 2 liter stainless steel reaction vessel equipped with a condenser. Under nitrogen atmosphere, the temperature of the mixture was raised to 205° C. with stirring. After water (330 ml) was distilled off water, the reaction system was cooled to 180° C.

The reaction mixture was introduced into a 2 liter autoclave equipped with a stainless stirrer which was previously adjusted at 180° C. under nitrogen atmosphere. To the reaction system were added p-dichlorobenzene (294 g, 2 moles), 1,2,4-trichlorobenzene (1.1 g, 0.006 mole) and N-methylpyrrolidone (180 ml). The autoclave was closed and polymerization reaction was carried out at 180° to 240° C. for 1 hour, at 240° to 270° C. for 1 hour and at 270° C. for 2 hours, with stirring.

After cooling, the reaction mixture was taken out of the autoclave and N-methylpyrrolidone was filtered off. The residue was washed several times with hot water and acetone. After drying, PPS (196 g) was obtained as white powder. PPS thus obtained had intrinsic viscosity: 0.24: melt viscosity: 3,200 poises: L value: 91: and Na content: 280 ppm.

EXAMPLE 2

N-Methylpyrrolidone (230 ml), sodium sulfide nonahydride (144.1 g, 0.6 mole), sodium Nevile Winther's acid (44.8 g, 0.2 mole) and sodium hydroxide (8 g, 0.2 mole) were placed in a 2 liter stainless steel reaction vessel equipped with a condenser. Under nitrogen atmosphere, the temperature of the mixture was raised to 205° C. with stirring. After water (100 ml) was distilled off, the reaction system was cooled to 180° C.

The reaction mixture was introduced into a 2 liter autoclave equipped with a stainless stirrer which was previously adjusted at 180° C. under nitrogen atmosphere. To the reaction system were added p-dichlorobenzene (88.2 g, 0.6 mole), 1,2,4-trichlorobenzene (0.33 g, 0.0018 mole) and N-methylpyrrolidone (200 ml). The autoclave was closed and polymerization reaction was carried out at 180° to 240° C. for 1 hour, at 240° to 260° C. for 1 hour and at 260° C. for 2 hours, with stirring.

After cooling, the reaction mixture was taken out of the autoclave and N-methylpyrrolidone was filtered off. The residue was washed several times with hot water and acetone. After drying, PPS (62 g) was obtained as white powder. PPS thus obtained had intrinsic viscosity: 0.20; melt viscosity: 700 poises: L value: 81; and Na content: 800 ppm.

COMPARATIVE EXAMPLE 1

According to the same manner as in Example 1, the dehydration reaction was carried out except that sodium p-phenol sulfonic acid and sodium hydroxide were not added. The polymerization reaction was carried out by using p-dichlorobenzene, 1,2,4-trichlorobenzene and N-methylpyrrolidone according to the same manner as in Example 1 to obtain PPS (180 g) as pale gray powder. PPS thus obtained had intrinsic viscosity: 0.10: melt viscosity: 80 poises: L value: 79.0 and Na content: 600 ppm.

COMPARATIVE EXAMPLE 2

N-Methylpyrrolidone (220 ml), sodium sulfide nonahydride (144.1 g, 0.6 mole) and sodium p-toluene sulfonate (0.1 mole) were placed in a 2 liter stainless steel reaction vessel equipped with a condenser. Under nitrogen atmosphere, the temperature of the mixture was raised to 205° C. with stirring. After distilled off water (100 ml), the reaction system was cooled to 180° C.

According to the same manner as in Example 2, to the resulting reaction mixture were added p-dichlorobenzene, 1,2,4-trichlorobenzene and N-methylpyrrolidone and the polymerization reaction was carried out to obtain off-white particulate PPS (60 g). PPS thus obtained had intrinsic viscosity: 0.16: melt viscosity: 200 poises: L value: 79: and Na content: 1,100 ppm.

COMPARATIVE EXAMPLE 3

When, according to the same manner as in Comparative Example 2, the reaction was carried out except that sodium hydroxide (0.1 mole) was used together with ptoluene sulfonic acid (0.1 mole) in stead of using sodium ptoluene sulfonate, the polymerization reaction did not proceed at all.

EXAMPLE 3

N-Methylpyrrolidone (900 ml), sodium sulfide nonahydride (960.7 g, 4 moles), sodium p-phenol sulfonate dihydride (61.9 g, 0.26 mole) and sodium hydroxide (10.7 g, 0.26 mole) were placed in a 5 liter stainless steel reaction vessel equipped with a condenser. Under nitrogen atmosphere, the temperature of the mixture was raised to 205° C. over 2 hours with stirring. After water (650 ml) was distilled off, the reaction system was cooled to 180° C.

The reaction mixture was introduced into a 5 liter autoclave equipped with a stainless stirrer which was adjusted at 180° C. under nitrogen atmosphere. To the reaction system were added p-dichlorobenzene (588 g, 4 moles), 1,2,4-trichlorobenzene (2.18 g, 0.012 mole), N-methylpyrrolidone (400 ml) and further sodium sulfate (248 g, 2 moles). The autoclave was closed and polymerization reaction was carried out at 180° to 240° C. for 1 hour, at 240° to 270° C. for 1.5 hours and at 270° C. for 2.5 hours, with stirring at positive pressure of 2 kg/cm² under nitrogen atmosphere. At the end of the reaction, the inner pressure was raised to 16 kg/cm².

After cooling, the reaction mixture was taken out of the autoclave and N-methylpyrrolidone was filtered off. The residue was washed several times with hot water and acetone. After drying, PPS (392 g) was obtained as white powder. PPS thus obtained had intrinsic viscosity: 0.27; melt viscosity: 3,500 poises; L value: 90; and Na content: 400 ppm.

EXAMPLE 4

A reaction mixture obtained according to the same manner as in Example 2 was introduced into a 2 liter autoclave equipped with a stainless stirrer which was adjusted at 180° C. under nitrogen atmosphere. To the reaction system were added p-dichlorobenzene (88.2 g, 0.6 mole), 1,2,4-trichlorobenzene (0.33 g, 0.018 mole), N-methylpyrrolidone) (200 ml) and further sodium sulfate (42.6 g, 0.3 mole). The autoclave was closed and polymerization reaction was carried out at 180° to 240° C. for 1 hour, at 240° to 260° C. for 1 hour and at 260° C. for 2.5 hours, with stirring.

After cooling, the reaction mixture was taken out of the autoclave and N-methylpyrrolidone was filtered off. The residue was washed several times with hot water and acetone. After drying, PPS (61 g) was obtained as white powder. PPS thus obtained had intrinsic viscosity: 0.22: melt viscosity: 2,000 poises: L value: 84; and Na content: 700 ppm.

COMPARATIVE EXAMPLE 4

When, according to the same manner as in Comparative Example 2, the reaction was carried out except that sodium hydroxide (0.1 mole) and sodium sulfate (0.1 mole) were used together with p-toluene sulfonic acid (0.1 mole) in stead of using sodium p-toluene solfonate, the polymerization reaction did not proceed at all.

PPS thus prepared by the process of the present invention has great whitenesee and high heat stability in addition to excellent properties possessed by conventional PPS such as excellent fire resistance, heat resistance, chemical resistance, electrical properties and the like. Further, in the present invention, because PPS is obtained in the form of powder after polymerization reaction, the solvent, salts and the polymerization catalysts can be readily removed by a simple washing and thereby PPS containing a less amount of electrolytes can be obtained. Furthermore, because, in comparison with a conventional process, PPS having less branching with high melt viscosity and high intrinsic viscosity can be obtained by a less amount of the polymerization catalysts, the resulting PPS is suitable for melt molding and is very useful for engineering plastics, films, fibers, sealing compounds and the like.

In addition, PPS obtained by the process of the present invention has a desired crystallization rate and thereby, it is advantageous for orientation in the production of films and fibers as well as for providing great strength and modulus to products.

What is claimed is:

1. A process for preparing a polyarylene sulfide which comprises reacting an alkali metal sulfide compound and a polyhalo-substituted aromatic compound in an organic polar solvent in the presence of
(A) an alkali metal salt of a phenolic aromatic sulfonic acid of the formula:

$$(HO)_m-Ar-(SO_3M)_n$$

wherein Ar is a di- to tetravalent aromatic group having 6 to 24 carbon atoms: M is an alkali metal; and m and n are each 1 or 2, and (B) an alkali metal hydroxide, an alkali metal alcoholate or mixture thereof.

2. A process according to claim 1, wherein the reaction is carried out in the presence of
 (C) an alkali metal salt of sulfuric acid in addition to the compounds of (A) and (B).

3. A process according to claim 1, wherein the compound (A) is present in an amount of 0.02 to 1.0 mole per 1 mole of the alkali metal sulfide compound.

4. A process according to claim 1, wherein the compound (A) is an alkali metal salt of p-phenol sulfonic acid.

5. A process according to claim 1, wherein the compound (B) is present in the molar ratio to hydroxy group in the compound (A) of 0.5 to 1.5.

6. A process according to claim 2, wherein the compound (C) is present in the molar ratio to hydroxy group in the compound (A) of 0.2 to 10.

7. A process according to claim 1, wherein the reaction is carried out at about 210° to 280° C. under pressure of 10 to 30 kg/cm$^2$.

* * * * *

UNITED STATES PATENT AND TRADEMARK OFFICE
CERTIFICATE OF CORRECTION

PATENT NO. : 4,663,431

DATED : May 5, 1987

INVENTOR(S) : Tsuguo Fujii et al

It is certified that error appears in the above-identified patent and that said Letters Patent is hereby corrected as shown below:

```
Column 3, line 12, "hydride" should be --hydrate--
Column 3, line 14, "hydride" should be --hydrate--
Column 4, line 40, "hydrides" should be --hydrates--
```

Signed and Sealed this

Eighth Day of December, 1987

Attest:

DONALD J. QUIGG

*Attesting Officer*  *Commissioner of Patents and Trademarks*